United States Patent [19]
Grey et al.

[11] Patent Number: 5,469,691
[45] Date of Patent: *Nov. 28, 1995

[54] PROCESS FOR RECYCLING A SHIPPING CONTAINER

[75] Inventors: Michael J. Grey, Richboro, Pa.;
William H. Shaw, Manchester, Mass.

[73] Assignee: Resource America, Inc., Southampton, Pa.

[*] Notice: The term of this patent subsequent to Jul. 21, 2009, has been disclaimed.

[21] Appl. No.: 71,595

[22] Filed: Jun. 2, 1993

Related U.S. Application Data

[63] Continuation of Ser. No. 906,000, Jun. 26, 1992, abandoned, which is a continuation of Ser. No. 719,026, Jun. 21, 1991, abandoned, which is a division of Ser. No. 427,812, Oct. 26, 1989, abandoned.

[51] Int. Cl.$^6$ .......................... B65B 23/00; B65B 61/02; B65D 85/42
[52] U.S. Cl. .................. 53/472; 53/474; 53/491
[58] Field of Search .................. 53/472, 467, 491, 53/484, 377.3, 376.4, 474, 411; 229/101.1, 3.1, 101.2; 206/523, 524, 591, 594, 459, 232

[56] References Cited

U.S. PATENT DOCUMENTS

| | | |
|---|---|---|
| 901,576 | 1/1909 | Randall . |
| 1,405,002 | 1/1922 | Rhodes . |
| 1,570,533 | 1/1926 | Styll . |
| 2,132,956 | 10/1938 | Kieckhefer ........................ 229/3.1 |
| 2,229,223 | 1/1941 | Rhodes . |
| 2,341,845 | 2/1944 | Mark et al. ........................ 229/3.1 |
| 2,367,520 | 1/1945 | Patek ........................ 229/3.1 |
| 3,015,197 | 1/1962 | Eichorn ........................ 53/491 X |
| 3,416,648 | 12/1968 | Levi . |
| 3,421,679 | 1/1969 | Goldman ........................ 206/523 |
| 3,463,343 | 8/1969 | Asenbauer . |
| 3,531,040 | 9/1970 | Myny ........................ 206/523 |
| 3,564,811 | 2/1971 | Freeman . |
| 3,565,243 | 2/1971 | Freeman ........................ 206/523 |
| 3,701,466 | 10/1972 | Richter . |
| 3,750,871 | 8/1973 | Cook ........................ 206/523 |
| 3,890,762 | 6/1975 | Ernst et al. . |
| 3,973,720 | 8/1976 | Schmid . |
| 4,042,108 | 8/1977 | Brethauer ........................ 206/392 |
| 4,046,311 | 9/1977 | Voytko . |
| 4,069,938 | 1/1978 | Palte et al. . |
| 4,122,946 | 10/1978 | Holley ........................ 206/523 |
| 4,160,503 | 7/1979 | Ohlbach ........................ 206/328 |

(List continued on next page.)

FOREIGN PATENT DOCUMENTS

| | | |
|---|---|---|
| 06195 | 7/1990 | WIPO . |
| WO 91/06477 | 5/1991 | WIPO . |

OTHER PUBLICATIONS

Tomey, "Returnable Packaging Components in Physical Distribution Systems", SPHE Technical Journal, Spring 1984, pp. 9–13.
"Returnable Packaging Manual", Aug. 1980, 14 pages.
"Returnable Packaging", DuPont, Aug. 1993, 43 pages.
"Textile Fibers Returnable Packaging", DuPont, Jul. 1988, 31 pages.
Article on DuPont's "Revpac" returnable components, Wilmington, Delaware, Nov. 1980, two pages.
Article on DuPont's "Revpac" returnable components, date unknown, two pages.
"Lycra™ Package", DuPont, date unknown, 14 pages.
Textile Products and Processes, vol. III, No. VI, Jun. 1980, two pages.

*Primary Examiner*—James F. Coan
*Attorney, Agent, or Firm*—Testa, Hurwitz & Thibeault

[57] ABSTRACT

A cushioned shipping assembly includes a corrugated carton and foam inserts which are returned by an end user to the fabricator. In some embodiments, the carton collapses to a diminished size for return. The fabricator refurbishes the components, recycling aged or spent pieces. Preferably polyolefin foams, olefin-based adhesives and coatings, and wood fiber-based corrugated material make up the cushioned system, and one component is compatible with recycling processes of others. The fabricator may perform on-premises pelletizing of reclaimed polymer, thus providing a more efficient, environmentally clean system.

11 Claims, 4 Drawing Sheets

U.S. PATENT DOCUMENTS

| | | |
|---|---|---|
| 4,173,286 | 11/1979 | Stanko . |
| 4,461,395 | 7/1984 | Burnett . |
| 4,468,913 | 9/1984 | Guillon et al. . |
| 4,497,859 | 2/1985 | Baumann . |
| 4,498,598 | 2/1985 | Bae . |
| 4,509,656 | 4/1985 | Rosler . |
| 4,535,929 | 8/1985 | Sherman, II et al. . |
| 4,602,715 | 7/1986 | Sarver et al. . |
| 4,640,418 | 2/1987 | Lowry ................................ 206/523 X |
| 4,709,817 | 12/1987 | Keady et al. ........................... 206/523 |
| 4,714,169 | 12/1987 | Keenan et al. . |
| 4,724,976 | 2/1988 | Lee . |
| 4,746,059 | 5/1988 | Jackson . |
| 4,785,957 | 11/1988 | Beck et al. . |
| 4,790,120 | 12/1988 | Manduley et al. . |
| 4,807,808 | 2/1989 | Reed . |
| 4,836,379 | 6/1989 | Shaw ...................................... 206/523 |
| 4,848,062 | 7/1989 | Manduley et al. . |
| 4,890,851 | 7/1989 | Oestreich, Jr. et al. . |
| 4,969,312 | 11/1990 | Pivert et al. . |
| 5,062,527 | 11/1991 | Westerman .............................. 229/117 |
| 5,131,212 | 7/1992 | Grey et al. ................................. 53/472 |
| 5,146,732 | 9/1992 | Grey et al. ................................. 53/472 |
| 5,247,747 | 9/1993 | Grey et al. ................................. 53/472 |

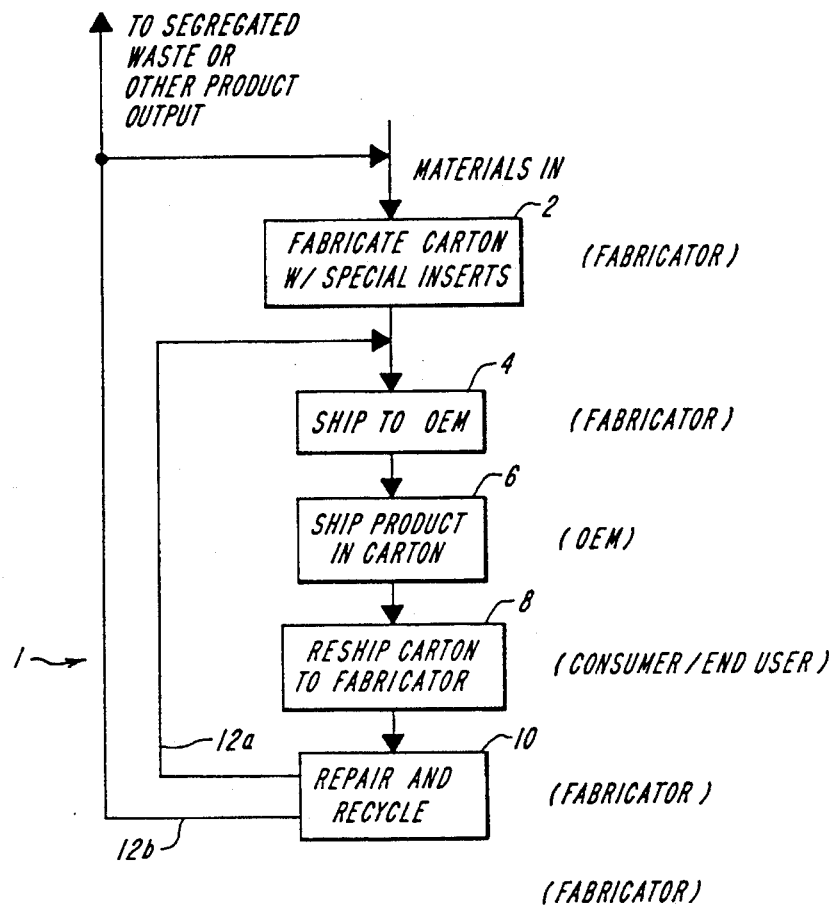

FIG. 1

| MATERIALS FOR PULP-BASED SHIPPING CARTON | | |
|---|---|---|
| CUSHIONING | ADHESIVES | COATINGS |
| POLYETHYLENE FOAM | HOT MELT WAXES | MICHAELMAN COATINGS |
| POLYPROPYLENE FOAM | OLEFINS | COMPATIBLE SURFACES FILM/COATINGS |
| EVA-POLYETHYLENE COPOLYMERS | MATERIALS COMPATIBLE WITH RECYCLING CUSHION OR BOARD | COMPATIBLE RELEASE COATINGS |
| ETHYLENE VINYL ACETATE FOAM | | |
| POLYOLEFIN-BASED FOAM | | |
| RESILIENT POLYSTYRENE COPOLYMERS | | |
| POLYURETHANES | | |

PROCESS FOR RECYCLING A SHIPPING CONTAINER

This is a continuation of U.S. patent application Ser. No. 07/906,000 filed Jun. 26, 1992, abandoned, which is a continuation of U.S. patent application Ser. No. 07/719,026 filed Jun. 21, 1991, abandoned, which is a divisional of U.S. patent application Ser. No. 07/427,812 filed Oct. 26, 1989, abandoned.

BACKGROUND OF THE INVENTION

The present invention relates to packaging and shipping containers, such as fiberboard boxes, which are adapted toga particular size or shape of product or object, and are used to enclose and protect the object against shock during shipment. In particular, it relates to such shipping containers which include cushioning or inserts.

Such containers are commonly used for the packaging or shipment of microcomputers, CRT displays and workstations, as well as for delicate electronic or optical instruments and like consumer goods. The foam cushioning employed in the interior of a carton for these purposes may consist of broad sheets, rectangular blocks, or even of contoured molded foam which conforms to the shape of the object being shipped. The foam material may be selected to provide protection against impact and vibration, protection against crushing, or a combination of these properties, and it may be in the form of loose inserts or in the form of cushion members permanently affixed either to the carton or to protective support or cap members that fit within the carton.

The aforesaid products generally have a volume of up to several cubic feet, and the amount of cushioning involved in their packaging may be substantial. Where the product is an irregularly shaped object, such as a console or work station, the complexity and cost of the shipping assembly itself may be significant. Nonetheless, almost all containers of this type are single-use containers, intended to be discarded by the end user who receives the shipped product. The disposal of such packaging materials raises environmental concerns, and the nature of prior art packaging systems further renders it difficult to effect such disposal in an environmentally sound manner.

Accordingly, it is desirable to provide a more efficient and environmentally sound cushioned shipping container. It is also desirable to provide a general method for making and recycling shipping containers.

SUMMARY OF THE INVENTION

These ends are achieved in accordance with a method of the present invention by providing a shipping package assembly including an external carton formed of a woodpulp based material, and a plurality of foam cushion inserts that define a product support. After shipment of a product in the assembly, the empty assembly with its inserts or portions thereof is reshipped, preferably by an alternate carrier, to the shipping package fabricator or authorized third party who then inspects and refurbishes the carton and the inserts, to the extent necessary, and returns the assembly to the product manufacturer to ship another product. The various materials employed for the carton and the foam cushioning are adapted to withstand multiple uses, are selected to be recyclable, and are compatible with reprocessing of the other materials.

In a preferred embodiment of the assembly for this method of fabrication and re-use, the cushioning material is formed of a polyolefin foam, such as a polyethylene foam, and the inserts, if attached, are preferably bonded to the carton by a heat-melt wax or similar olefin-based adhesive. The carton itself is formed of corrugated cardboard, and the cardboard may be coated with a Michaelman-type or other coating to enhance its strength and resistance to water and scuffing without impairing its suitability for re-pulping.

In particular or further preferred embodiments, the carton is of a two-piece or collapsible construction which attains a reduced size when emptied of the product, so that, once the carton is emptied, the carton and inserts may be returned to the fabricator in a smaller form. Advantageously, the carton is shipped by an alternate carrier, e.g., by a courier or by a consumer package delivery network such as UPS, which would not accept the full size carton.

Preferably, the shipping assembly includes a prominent surface display and a label window with appropriate legends to assure that the assembly is routed in order to the product user and to the fabricator.

BRIEF DESCRIPTION OF THE DRAWINGS

These and other features of the invention will be understood from the following detailed description, taken together with drawings of illustrative embodiments, wherein FIG. 1 is a block diagram of a method according to the invention;

FIG. 2 is a table of representative materials for the structural elements contemplated for various embodiments of a cushioned shipping assembly according to the invention;

DETAILED DESCRIPTION

Figure 3:
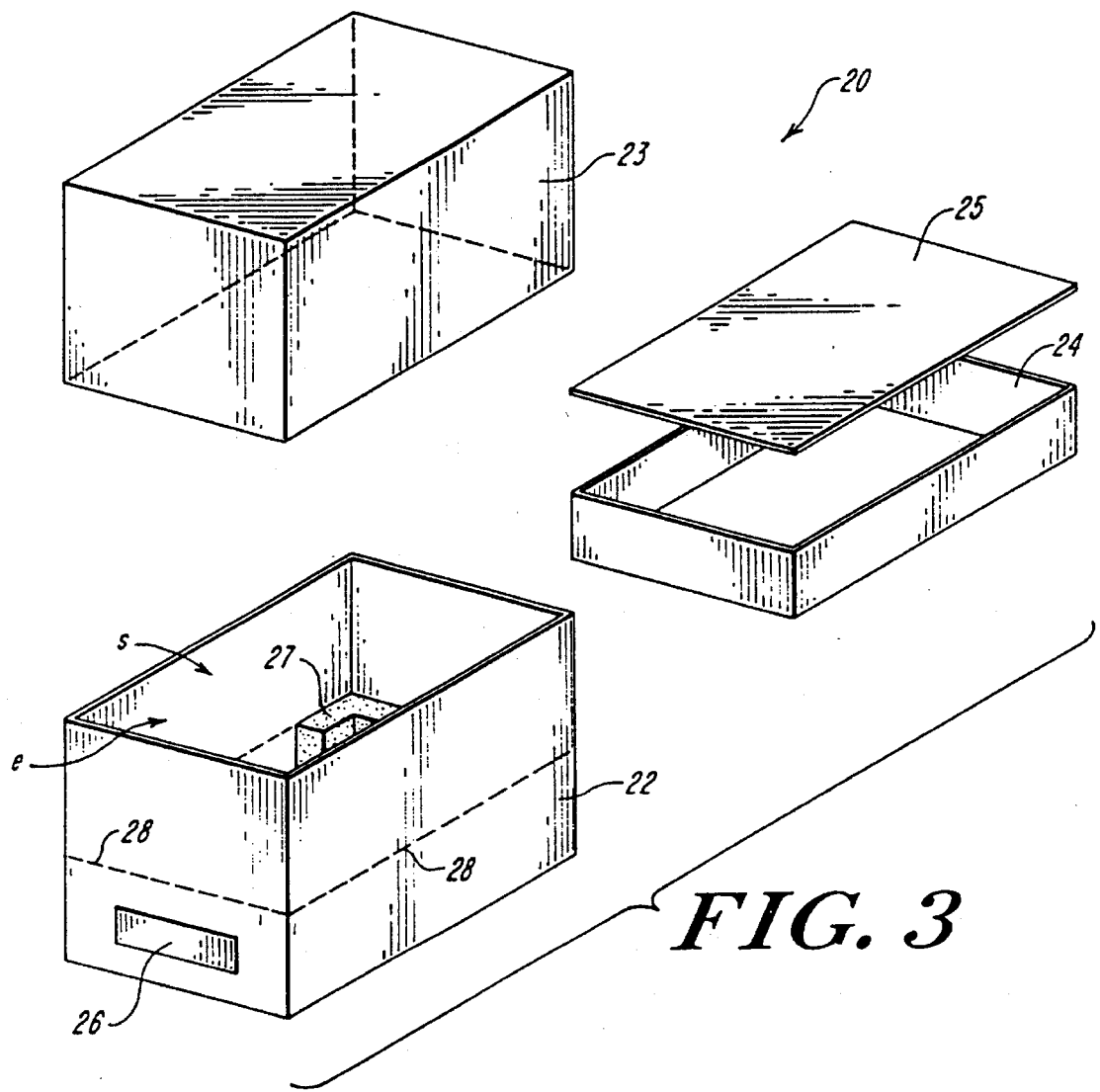
FIG. 3 is a perspective view of one embodiment of a carton which may be employed in accordance with the invention.

According to a principal aspect of the invention, a method of providing cushioned shipping assembly includes the steps wherein a packaging fabricator provides to a manufacturer or other user a carton with a plurality of cushioning members suitable for the user's product, and, after the assembly has been used to ship the product to a purchaser or consumer, the carton and cushioning members, or a major portion thereof, is reshipped to the fabricator and the entire assembly is refurbished and reused. At the end of a useful lifetime, which may vary for different components of the system, each worn component is recycled. As will be described in greater detail below, particular materials and constructions relate cooperatively to the different steps involved in reshipment, reuse and reclamation of materials.

As shown in FIG. 1, the system 1 of the present invention includes a packaging system which is actively handled by different persons or businesses in succession. Initially at 2 the packing system, comprising a carton and any special inserts, is assembled by a fabricator from a set of materials such as corrugated panels, adhesives and bulk polymers.

The fabricator typically will have facilities for molding foam shapes, or for forming or shaping plastic foam sheets or blocks, and possibly films, and facilities for fabricating (e.g. cutting, folding and gluing) wood-pulp based cartons. At 4, the fabricator then provides the shipping assemblies to an OEM, such as a manufacturer of computer terminals or the like, and at step 6 the OEM ships its product in the packaging to a distributor, end user or the like. At step 8, the emptied assembly is reshipped by the end user to the fabricator. At step 10 the fabricator inspects and refurbishes the packaging assembly, reclaiming any spent materials for safe disposal or recycling to a second use. At step 12, as at step 4, the packaging system is again provided to the OEM. Conceptually, step 12 involves two substeps corresponding to the different acts of refurbishing or recycling performed at step 10. In one substep, denoted 12a, the system is refurbished, which may involve one or more of the original fabrication processes of step 2. In the other substep denoted 12b, the spent components are reclaimed and recycled. This involves separating and preferably reprocessing the components, for example, by forming polyethylene sheet film products from spent polyethylene foam material. The second use of a recycled component may or may not be performed on-premises, and may either result in a product useful as a shipping assembly component in step 2, or as a separate product for an external market. Thus, as indicated in the Figure, step 12b may provide further materials to be used in step 2.

It should be noted that while the end user appears only at step 8 to return the packaging to the fabricator, in some embodiments the end user's participation may be substantially greater. For example, when used for shipping medical devices and supplies to a hospital, clinic, or research laboratory, where the receiving institution may be expected to have waste segregation or processing protocols in effect, the present system contemplates that such protocols may be utilized to segregate and recycle or reship to the fabricator the used packaging assemblies or separated components thereof. For such medical packaging it is understood that the reuse of components will further include the step of sterilization of packaging for each transit.

Returning to FIG. 1, the first three steps of the method 2, 4, 6 are conventional. The remaining steps, when practiced according to the invention as discussed further below, are environmentally beneficial and offer benefits to each person. These steps involve the participation of additional persons in the system for its effectiveness. Certain preferred construction features of the system as described more fully below render the performance of these additional steps convenient to achieve, economically beneficial or functionally self-effecting.

In accordance with a first preferred aspect of the invention, the materials of construction for the container system are selected from among materials which can be effectively reclaimed after use and preferably recycled, when worn beyond reuse, by fabrication into new and generally different products. FIG. 2 sets forth a table, by way of example, showing representative materials which may be used for cushioning, bonding, and carton coating in a system for a corrugated cardboard or pulp-based packaging construction in accordance with the present invention.

As shown in the Table, the invention contemplates that one or more coatings or layers be applied to a corrugated container to implement the combination of recyclable elements thereof. These may include coatings to strengthen the skin of the board, so that the cushioning, shipping labels and the like may be removed without damaging the container and so that surface blemishes from impact are minimized, and also may include release coatings for labels, and waterproofing coatings and scrubbable surface coatings to prevent the accumulation of soil on the carton in use. Suitable coatings include Michaelman coatings such as a Michaelman X-300, and other surface films and release coatings which do not impair the suitability of the board for re-pulping and re-use.

The contemplated cushioning materials include foams which provide shock resistance without crushing, so that the cushion blocks perform effectively for at least several initial usages, and which also may be re-cycled into second-use products, such as films or denser extruded products. Preferably the cushion blocks are designed to survive multiple shipping/storage cycles without falling below a specified level of cushioning quality. This is achieved in part by providing larger "footing" or contact surfaces, employing a lesser static loading value to determine the size of cushion blocks for a particular product, and a compounding the foam to have relatively longer-lived mechanical properties. The material employed for the foam is resilient. Preferably, the stock polymer material is not highly cross-linked. Suitable foams are polyethylene foam, polypropylene foam, EVA and other polyolefin foams, and copolymers thereof, among others. The invention contemplates that the worn cushion members will be reprocessed by densifying the foam back into pellets of stock polymer, and that this material will be recycled, either at the fabricator, or elsewhere under contract, into film or other plastic product. Finally, as indicated in the Table, it is contemplated that the adhesives used for adhering the board to the cushion blocks, or to cement folds of the carton upon itself, preferably include hot melt waxes, olefins or bonding materials compatible with the two principal components and with the processes involved in their recycling.

It will be appreciated that the system of the present invention achieves a significant efficiency of materials consumption since the re-use of the packaging system even two or three times results in effectively using a half or a third as much material per transit; minor refurbishing offers greater savings. The invention thus operates to reduce consumption, as well as to recycle the used materials.

Within one or more of the above constructions, the invention contemplates that the return of the used assembly to the fabricator be promoted or enhanced by providing a prominent graphic display instructing the user how to return the container or components thereof. For example, a block print legend is preferably printed under, or adjacent to, a removable invoice/label pocket, bearing the legend "THIS IS A (DEPOSIT-TYPE) RETURNABLE ENVIRONMENTAL RECYCLABLE CONTAINER. PLEASE DELIVER TO OR CALL UNITED PARCEL SERVICE TO PICK UP THIS CONTAINER UNDER CONTRACT AXXXXX FOR RETURN TO XYZ FABRICATOR, CITY, STATE."

In the practice of the invention, it is contemplated that when used in conjunction with a manufacturer's ordering, shipping and production software systems, several different such legends may be automatically printed out on labels which direct the return either to the fabricator (when re-use is contemplated), or to a local reclamation center (when the carton is configured for a product for which no further shipments are scheduled).

FIG. 3 illustrates one exemplary embodiment of the invention. A carton 20 is formed of a bottom 22, a top 23 and preferably one or more cardboard inserts 24, 25. Bottom 22 is formed of a high strength double walled corrugated board, and, as illustrated, has the above-described fabricator return freight legend 26 on an outer face thereof. Top 23 is formed of a lightweight material and forms a cap which telescopically slides over the bottom portion to form a closed box. Top 23, which may have a calendared, printed surface, is discarded after shipping, while bottom 22 containing at least one of attached cushioning 27 and separate unattached cushion blocks (not shown) is closed and reshipped to the fabricator after use. Arrows "s" and "e" indicate that the sides and ends form flaps, which fold down, along score lines 28 to close the carton into a diminished volume for return. A top sheet 25, which may have 97 attached cushion block and which is also returned with the bottom half 22, normally fits over the bottom 22, and may serve both to prevent the flaps from folding inward, and to provide full strength protection for the top face. An inner sleeve 24 may also be provided, after the first use and creasing of the flaps of bottom 22, to prevent folding in of the upper sides which have previously served as flaps.

Figure 4:
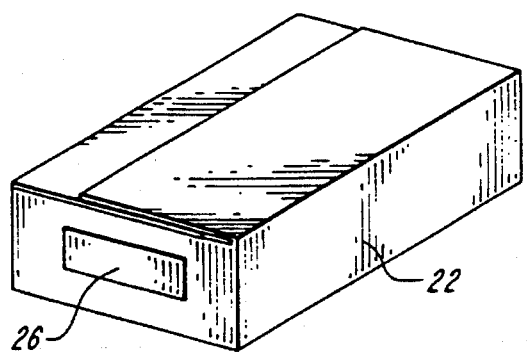
FIG. 4 illustrates the carton of FIG. 3 in a collapsed state for return to the fabricator.

FIG. 4 shows the portion of the assembly 20 consisting of bottom 22 and one or more of cushions 27, unattached blocks and inserts 25, folded into a closed position for return. In this position its combined dimensions are reduced to be less than 108 running inches or such other limit imposed by a parcel service, such as the federal postal service or United Parcel Service, so that the container may be economically returned, by single units rather than truckload lots, to the fabricator. It will be understood that when the product to be shipped fits in a packaging assembly that already meets the dimensional requirements of the parcel carrier, the use of the fold down carton of FIGS. 3,4 is optional, or if used, the assembly may be returned as is, without folding down.

Figure 5:
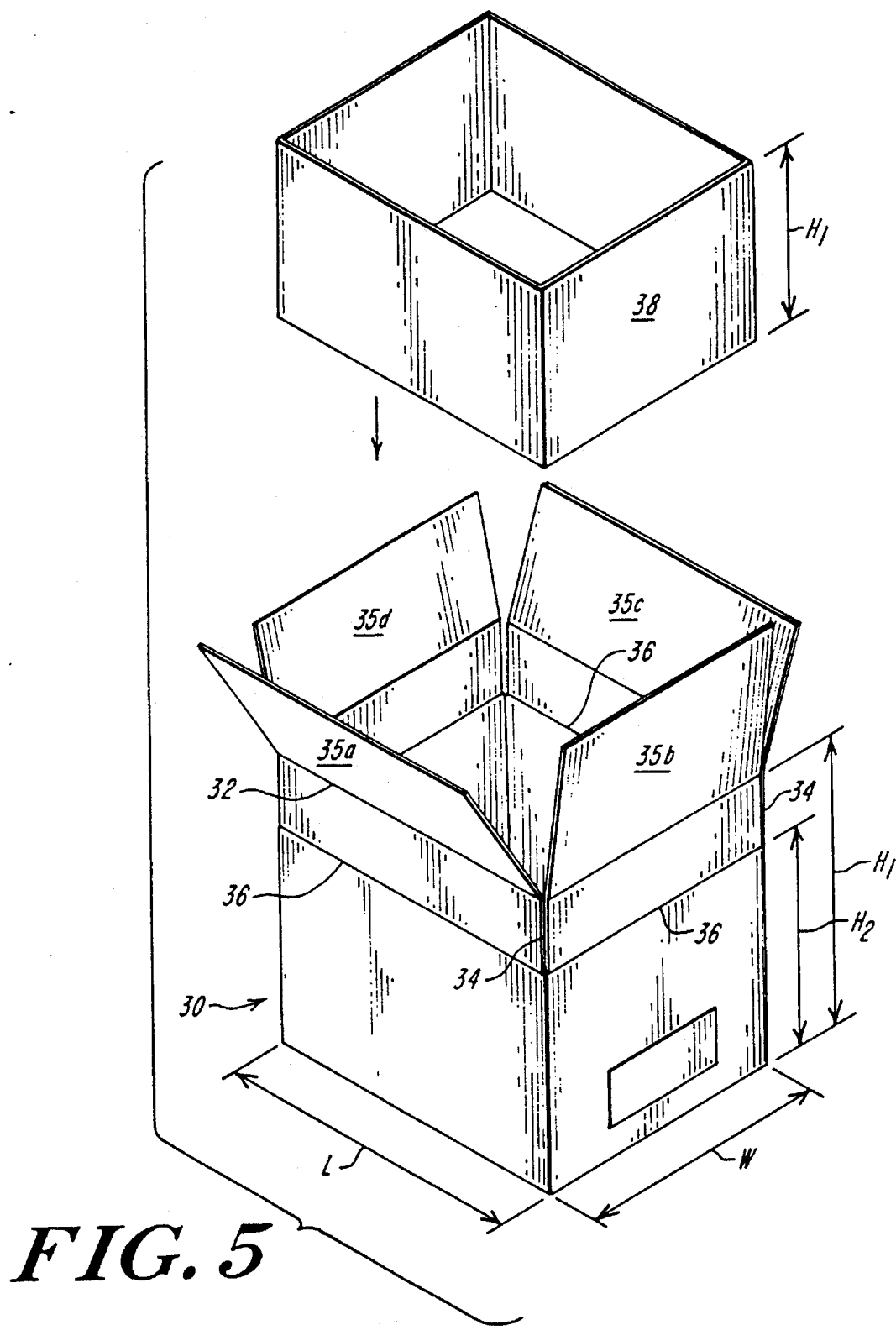
FIG. 5 illustrates another embodiment of a shipping carton in accordance with the invention.

FIG. 5 illustrates elements of another embodiment of the invention. In this embodiment, a cardboard carton 30 is provided having a length L, width W and height $H_1$, with creases 32 at height $H_1$ defining two pairs of opposed flaps for closing the carton. The vertical edges of the box are cut, i.e., slotted at 34, down to a lesser height $H_2$, and horizontal score lines 36 are provided at height $H_2$ which extend around the box so that after use the flaps 35a . . . 35d may be creased at the score lines 36 and folded down to provide a smaller shipping carton of diminished height $H_2$. With normal half-width or half-length flap geometries for the original flaps 35a . . . 35d, the reduction in height achieved by this embodiment for the return container is up to one-half of the length or width of the carton. Preferably, after this carton has been once used and returned, on subsequent uses an inner sleeve 38 of height $H_1$ fits within the full-height carton for shipping product. The sleeve is removed when it is again desired to return the carton in its reduced size.

Figure 6A:
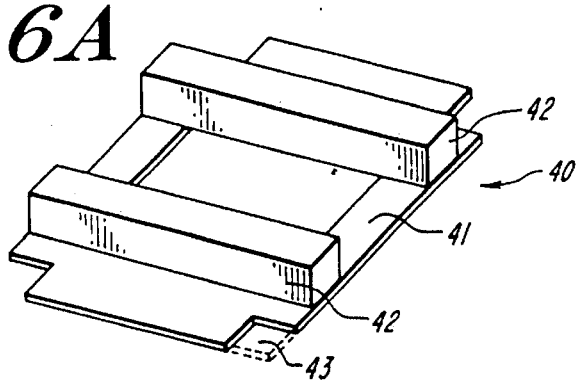
FIGS. 6A, 6B illustrate one preferred set of internal components for the practice of the invention with the cartons of FIGS. 3–5.
Figure 6B:
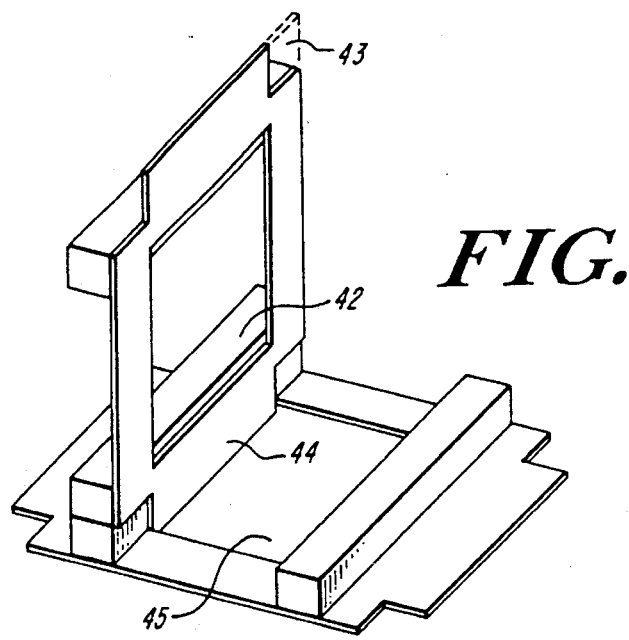

FIGS. 6A, 6B illustrate a cushioning member 40 of the type conventionally known as an end-cap, designed with particular suitability for the practice of this invention. Cushioning member 40 is illustrated as comprised of an annular plate 41 and several blocks 42 of substantial thickness which extend across the full width of the plate. Plate 41 may be formed of thick cardboard and dimensioned substantially in the illustrated proportions, to locate the assembly within a like-dimensioned rectangular carton, or may be formed of foam sheet stock like blocks 42, thereby providing both a locating and an additional shock-absorbing function. The cushion blocks 42 may face inwardly against a packaged product, to provide a product-cushioning as well as a product-positioning function, or may face outward toward the carton wall, thus providing only a cushioning function. In any event, the cushion blocks 42 and the plate 41 are assembled of elementary slab material.

For particular utility with this invention, the plate or foam slab 41 is formed with a notch 43 at each corner such that the portion 44 of the plate protruding beyond the block 42 fits within the central opening 45 of plate 41. With this arrangement, a pair of cushioning members 40 may be shipped as cushioning end cap members within a container according to the invention, and when it is desired to return the container, the two members may be crossed, as illustrated in FIG. 6B. This recesses one member within the other, while providing a full-width vertically extending structure that extends between the sides of the carton and stiffens the empty carton against the collapse.

Figure 7:
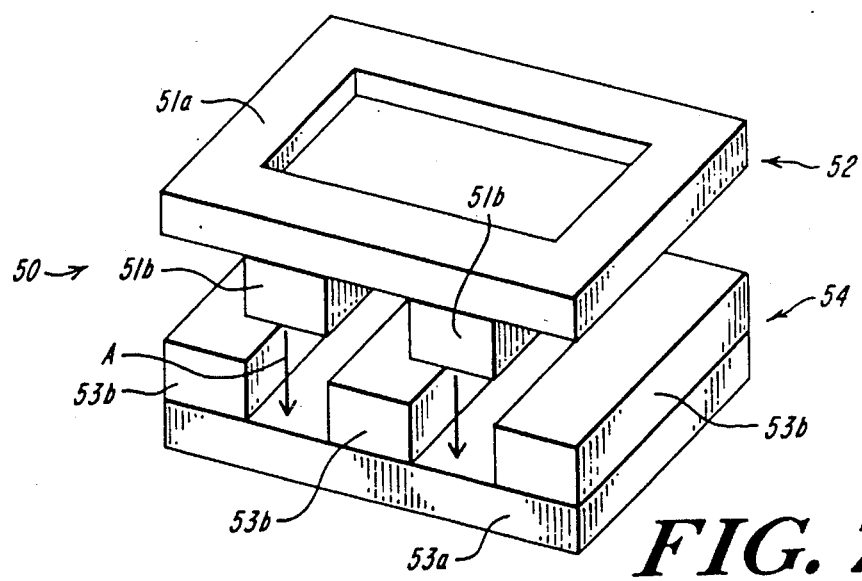
FIG. 7 illustrates different cushioning members for the practice of aspects of the invention.

FIG. 7 illustrates another suitable form of cushion assembly 50. In this embodiment, a first member 52 formed of a foam sheet 51a and cross slabs 51b provides one end cap, and a second member 54 formed of a foam sheet 53a and cross slabs 53b provides another end cap. The cross slabs 51b are offset from the slabs 53b so that they interfit between each other when the members 52, 54 are placed on each other in the emptied carton, thereby reducing the volume required for return of the cushioning members. Other end cap constructions of a more conventional type, such as a so-called slug cap and a so-called picture frame, with the projection of one sized to fit within the recess of the other, are also contemplated within the practice of the invention. In each case the foam material has the properties described above.

The method and system of exemplary embodiments of the invention being thus described, variations and modifications will occur to those skilled in the art, and all such variations and modifications embodying the teachings in this disclosure, are considered to be within the scope of the invention, as set forth in the claims appended hereto.

What is claimed is:

1. A process for recycling a shipping container comprising:

(a) providing to a product provider a shipping container and insert material for placement within the shipping container to provide a protective support for a product placed within the shipping container, the shipping container comprising a wood-pulp based material and the insert material comprising a polyolefin foam which is recyclable and designed to withstand multiple transits in normal shipping, (b) shipping to a customer the shipping container having therein the product and the insert material;

(c) providing the customer with printed directions for returning the shipping container and the insert material to a fabricator via a parcel service, (d) at the fabricator, inspecting and refurbishing or replacing the shipping container and the insert material, and causing whatever is replaced to be recycled; and (e) repeating steps (b), (c), and (d) during a useful lifetime of the shipping container and the insert material.

2. The process of claim 1 wherein the wood-pulp based shipping container defines flaps which are folded to reduce a volume of the shipping container prior to return to the fabricator via the parcel service pursuant to the printed directions.

3. The process of claim 1 wherein the shipping container includes a surface strengthening coating.

4. The process of claim 1 wherein the insert material is bonded to at least one inside surface of the shipping container with an adhesive.

5. A process for recycling a shipping container, comprising:
   (a) providing to a product provider a shipping container for receiving a product for shipment, the shipping container comprising a wood-pulp based material and defining flaps which are foldable to reduce a volume of the shipping container;
   (b) shipping to a customer the shipping container having the product therein;
   (c) providing the customer with printed directions for returning the shipping container to a fabricator via a parcel service;
   (d) after removal of the product, folding the flaps of the shipping container to reduce the volume of the shipping container from its original volume when the product was received therein, and then returning the folded shipping container to the fabricator via the parcel service pursuant to the printed directions;
   (e) at the fabricator, inspecting and refurbishing the shipping container or replacing portions thereof, and causing any replaced portions of the shipping container to be recycled; and
   (f) repeating steps (b),(c),(d), and (e) during a useful lifetime of the shipping container.

6. The process of claim 5 wherein the shipping container includes a surface strengthening coating.

7. A process for recycling a cushioned shipping container, comprising:
   (a) providing a shipping container and cushioning material for placement therewithin to provide a protective support for a product placed within the shipping container, the container comprising a wood-pulp based material and the cushioning material comprising a polyolefin foam which is recyclable and designed to withstand multiple transits in normal shipping;
   (b) shipping to a customer the shipping container having therein the product and the cushioning material;
   (c) providing the customer with printed directions for returning the shipping container and the cushioning material to a fabricator via a parcel service, wherein the wood-pulp based shipping container defines flaps which are folded to reduce a volume of the shipping container prior to return to the fabricator via the parcel service pursuant to the printed directions, and wherein the cushioning material comprises a first cushioning insert having a first complementary portion and a second cushioning insert having a second complementary portion, the first and second complementary portions respectively interfitting for compact placement into the reduced-volume shipping container prior to return to the fabricator;
   (d) at the fabricator, inspecting and refurbishing or replacing the shipping container and the cushioning material, and causing whatever is replaced to be recycled; and
   (e) repeating steps (b), (c), and (d) during a useful lifetime of the shipping container and the cushioning material.

8. The process of claim 7 wherein the inserts recess within each other such that the recessed inserts bear against six sides of an interior of the shipping container when placed within the shipping container to strengthen the container during return to the fabricator.

9. A process for recycling a cushioned shipping container, comprising:
   (a) providing to plural product providers a shipping container and cushioning material for placement within the container to provide a protective support for a product placed within the shipping container, the container comprising a wood-pulp based material and the cushioning material comprising a polyolefin foam which is recyclable and designed to withstand multiple transits in normal shipping;
   (b) shipping to a customer the shipping container having therein the product and the cushioning material;
   (c) providing the customer with printed directions for returning the shipping container and the cushioning material to a fabricator or a resource center via a parcel service;
   (d) at the fabricator or resource center, inspecting and refurbishing or replacing the shipping container and the cushioning material, and causing whatever is replaced to be recycled; and
   (e) repeating steps (b), (c), and (d) during a useful lifetime of the shipping container and the cushioning material.

10. The process of claim 9 wherein the wood-pulp based shipping container defines flaps which are folded to reduce a volume of the shipping container prior to return to the resource center via the parcel service pursuant to the printed directions.

11. The process of claim 9 wherein the cushioning material comprises at least two cushioning inserts which interfit for placement into the reduced-volume shipping container prior to return to the resource center.

* * * * *